United States Patent
Kunieda et al.

(10) Patent No.: US 7,613,319 B2
(45) Date of Patent: Nov. 3, 2009

(54) ELECTRONIC WATERMARK GENERATING APPARATUS, METHOD, AND PROGRAM FOR GENERATING ELECTRONIC WATERMARK

(75) Inventors: Shigetoshi Kunieda, Kawasaki (JP); Kouichi Sano, Ihara (JP); Naoki Watanabe, Tokyo (JP); Masaki Narahashi, Tokyo (JP)

(73) Assignee: Toshiba Tec Kabushiki Kaisha (JP)

( * ) Notice: Subject to any disclaimer, the term of this patent is extended or adjusted under 35 U.S.C. 154(b) by 753 days.

(21) Appl. No.: 11/401,381

(22) Filed: Apr. 10, 2006

(65) Prior Publication Data

US 2006/0227996 A1    Oct. 12, 2006

(30) Foreign Application Priority Data

Apr. 11, 2005  (JP)  .................... 2005-113446
Nov. 28, 2005  (JP)  .................... 2005-342399

(51) Int. Cl.
*G06K 9/00*  (2006.01)
*H04N 7/167*  (2006.01)

(52) U.S. Cl. ............... 382/100; 382/251; 380/200

(58) Field of Classification Search ............ 382/100, 382/103, 106, 107, 154, 162, 168, 174, 181, 382/190, 232, 233, 251, 260, 274, 276, 305, 382/312; 380/220, 200; 713/176
See application file for complete search history.

(56) References Cited

U.S. PATENT DOCUMENTS

| | | | |
|---|---|---|---|
| 6,647,125 B2 * | 11/2003 | Matsumoto et al. | 382/100 |
| 6,785,814 B1 * | 8/2004 | Usami et al. | 713/176 |
| 7,409,060 B2 * | 8/2008 | Nomizu et al. | 380/200 |
| 7,523,311 B1 * | 4/2009 | Matsui | 713/176 |
| 7,526,099 B2 * | 4/2009 | Kamijoh et al. | 382/100 |
| 7,545,938 B2 * | 6/2009 | Nomizu et al. | 380/220 |
| 2004/0117629 A1 | 6/2004 | Koto et al. | |

FOREIGN PATENT DOCUMENTS

| | | | |
|---|---|---|---|
| EP | 1 156 662 A1 | | 11/2001 |
| JP | 1 156 662 A1 * | | 1/2000 |
| JP | 3098513 | | 8/2000 |
| JP | 2001-203878 | | 7/2001 |

OTHER PUBLICATIONS

Siozaki Hirosi, Journal of the Institute of Image Electronic Engineers of Japan, vol. 31, No. 4, 2002 (pp. 616-622).

* cited by examiner

*Primary Examiner*—Seyed Azarian
(74) *Attorney, Agent, or Firm*—Harness, Dickey & Pierce, P.L.C.

(57) ABSTRACT

An electronic watermark generating apparatus color-converts an RGB image, and divides the color-converted image into a plurality of blocks. Then, the apparatus embeds to-be-embedded information as an electronic watermark into blocks in which an irreversible compression image has been quantized, the image being produced by carrying out quantization on a block-by-block basis, and restores the RGB image by carrying out de-quantization with respect to the blocks. The above apparatus color-converts the restored RGB image, and divides the color-converted image into a plurality of blocks. Thereafter, the apparatus carries out quantization on a block-by-block basis, and extracts to-be-embedded information from the thus quantized blocks. The apparatus embeds the to-be-embedded information as an electronic watermark again in the quantized blocks when it is not checked that the to-be-embedded information has been correctly extracted.

13 Claims, 11 Drawing Sheets

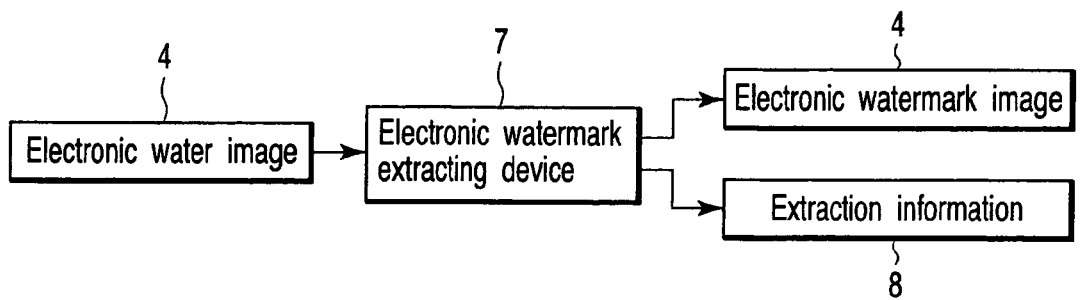
F I G. 10
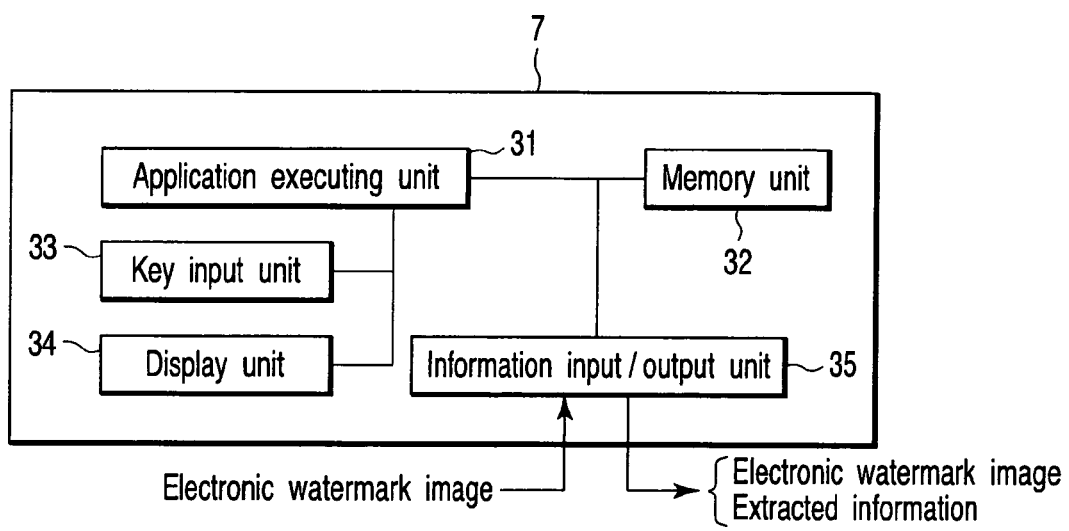
F I G. 11
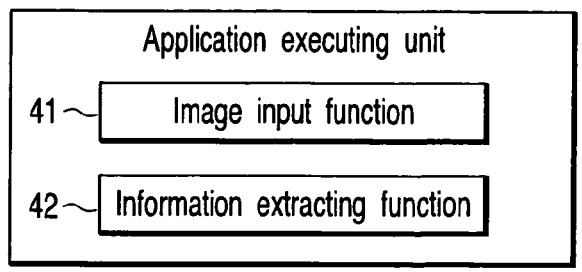
F I G. 12

ELECTRONIC WATERMARK GENERATING APPARATUS, METHOD, AND PROGRAM FOR GENERATING ELECTRONIC WATERMARK

CROSS-REFERENCE TO RELATED APPLICATIONS

This application is based upon and claims the benefit of priority from prior Japanese Patent Applications No. 2005-113446, filed Apr. 11, 2005; and No. 2005-342399, filed Nov. 28, 2005, the entire contents of both of which are incorporated herein by reference.

BACKGROUND OF THE INVENTION

1. Field of the Invention

The present invention relates to an electronic watermark generating method and electronic watermark generating program for an irreversible compression image such as a JPEG image.

2. Description of the Related Art

Conventionally, in the case where to-be-embedded information for generating an electronic watermark with respect to an irreversible compression image such as a JPEG image is embedded, and the embedded information is extracted from the irreversible compression image, such an embedding and extracting operation has been carried out for image data at a stage at which an irreversible process has completely terminated during image compression processing. For example, in the case where an electronic watermark is generated with respect to a JPEG image, embedding of to-be-embedded information is carried out with respect to a quantized coefficient before an encoding process is carried out after a quantizing process in a course of generating a JPEG image from an RGB image, or alternatively, before de-quantizing is carried out after the JPEG image has been subjected to a decoding process in the case of using a JPEG image (Japanese Patent No. 3098513, for example).

However, an electronic watermark generated with respect to a conventional irreversible compression image is not sufficient in durability. Therefore, in the case where, for example, an RGB image is restored by temporarily carrying out decoding, de-quantizing, inverse quadrature transform, block re-combining, and color conversion in order to produce an irreversible compression image having an electronic watermark embedded therein as one having a compression rate according to equipment specification, and then, the restored RGB image is produced as an irreversible compression image having a different compression rate by carrying out color conversion, dividing into a plurality of blocks, quadrature transform, quantizing, and encoding again, there has been a high possibility that information embedded as an electronic watermark cannot be extracted.

BRIEF SUMMARY OF THE INVENTION

It is an object of the present invention to provide an electronic watermark generating apparatus, an electronic watermark generating method, and an electronic watermark generating program with respect to an irreversible compression image, the apparatus, method, and program being capable of improving durability for electronic watermarking and extracting information embedded as an electronic watermark even if an irreversible compression image is reproduced after the irreversible compression image has been temporarily restored to an RGB image.

According to one aspect of the present invention, there is provided an electronic watermark generating apparatus comprising: embedding means for embedding to-be-embedded information as an electronic watermark in a quantized block of an irreversible compression image produced by carrying out quantization on a block-by-block basis after an RGB image has been subjected to color conversion to be divided in a plurality of blocks; restoring means for restoring an RGB image by carrying out de-quantization with respect to a block in which to-be-embedded information has been embedded by the embedding means; extracting means for color-converting the restored RGB image and dividing the color-converted RGB image into a plurality of blocks, and then, carrying out quantization on a block-by-block basis, thereby extracting to-be-embedded information from the quantized blocks; and re-embedding means for, when it is not checked that the to-be-embedded information has been correctly extracted by checking means for checking whether or not the to-be-embedded information has been correctly extracted by the extracting means, embedding the to-be-embedded information as an electronic watermark again in the quantized blocks.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a block diagram depicting an electronic watermark extracting system according to the same embodiment;

FIG. 11 is a block diagram depicting a configuration of essential portions of an electronic watermark extracting apparatus in the same electronic watermark extracting system;

FIG. 12 is a block diagram depicting a programming function of the application executing unit in the same electronic watermark extracting apparatus;

DETAILED DESCRIPTION OF THE INVENTION

Hereinafter, embodiments of the present invention will be described with reference to the accompanying drawings.

FIRST EMBODIMENT

Figure 1:
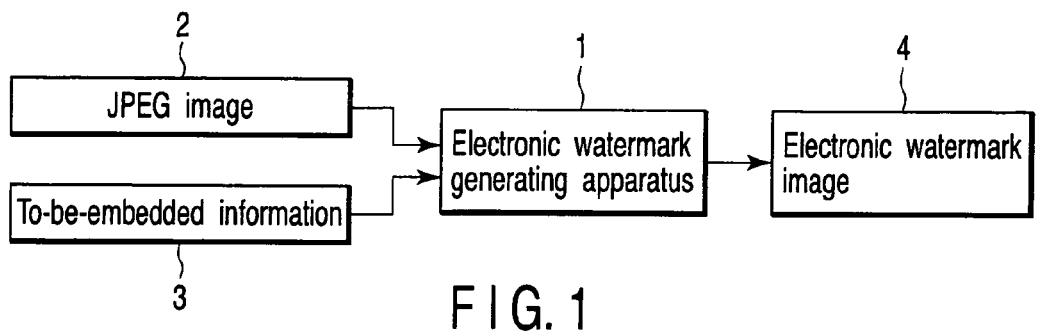
FIG. 1 is a block diagram depicting an electronic watermark generating system according to a first embodiment of the present invention.

First, a first embodiment will be described below. In FIG. 1, reference numeral 1 denotes an electronic watermark generating apparatus 1 for capturing a JPEG image 2 and to-be-embedded information 3 that are irreversible compression images, and then, embedding the JPEG image 2 with the to-be-embedded information 3, thereby generating an electronic watermark with respect to the JPEG image 2. An electronic watermark image 4 produced by embedding the to-be-embedded information 3, thereby generating an electronic watermark, is output from the apparatus 1. The to-be-embedded information 3 includes, for example, coupon information, commodity ticket information, and membership information such as a numeric value or text. The electronic watermark image 4 is utilized as, for example, an electronic coupon, an electronic commodity ticket, or an electronic membership certificate.

Figure 2:
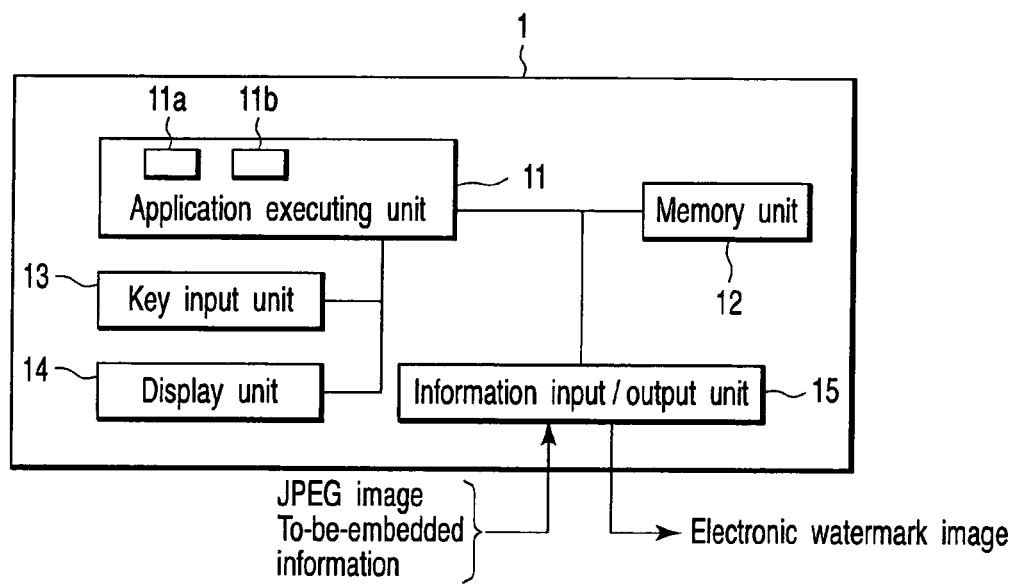
FIG. 2 is a block diagram depicting a configuration of essential portions of an electronic watermark generating apparatus in the same electronic watermark generating system.

The foregoing electronic watermark generating apparatus 1, as shown in FIG. 2, comprises: an application executing unit 11 for executing a variety of applications, the application execution section being composed of a CPU, a ROM, a RAM and the like; a memory unit 12 composed of a rewritable memory such as a RAM; a key input unit 13; a display unit 14 for displaying information such as an image or a text; and an information input/output unit 15 for externally inputting/outputting information. The electronic watermark generating apparatus 1 is provided in, for example, a server, a portable cellular phone, a POS terminal or the like. In the application executing unit 11, there is provided: an upper limit value setting unit 11a for setting an upper limit value and a lower limit value setting unit 11b for setting a lower limit value to repeat a process of embedding an electronic watermark, as described later in detail.

Figure 3:
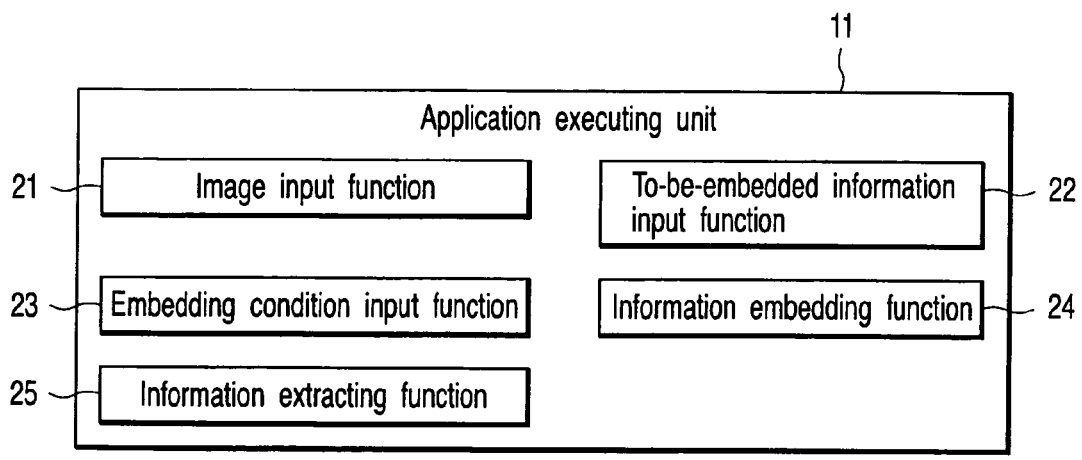
FIG. 3 is a block diagram depicting a programming function of an application executing unit in the same electronic watermark generating apparatus.

The application executing unit 11, as shown in FIG. 3, comprises: an image input function 21 for acquiring the JPEG image 2 from the information input/output unit 15 and also acquiring a JPEG image from the memory unit 12; a to-be-embedded information input function 22 for acquiring the to-be-embedded information 3 from the information input/output unit 15 and also acquiring to-be-embedded information from the key input unit 13 or memory unit 12; and an embedding condition input function 23 for, in the case of requiring an embedding condition at the time of embedding to-be-embedded information to a JPEG image, acquiring the embedding condition from the key input unit 13, information input/output unit 15, or memory unit 12.

The application execute section 11 comprises application programs for executing: a to-be-embedded information embedding function 24 for embedding the to-be-embedded information acquired by the to-be-embedded information input function 22 in the JPEG image acquired by the image input function 21 in accordance with the embedding condition acquired by the embedding condition input function 23; and an information extracting function 25 for extracting the to-be-embedded information from the electronic watermark image acquired by the image input function 21. The information embedding function 24 is designed to carry out information embedding under its internally owned predetermined condition In the case where no embedding condition is acquired in the embedding condition input function 23.

Figure 4:
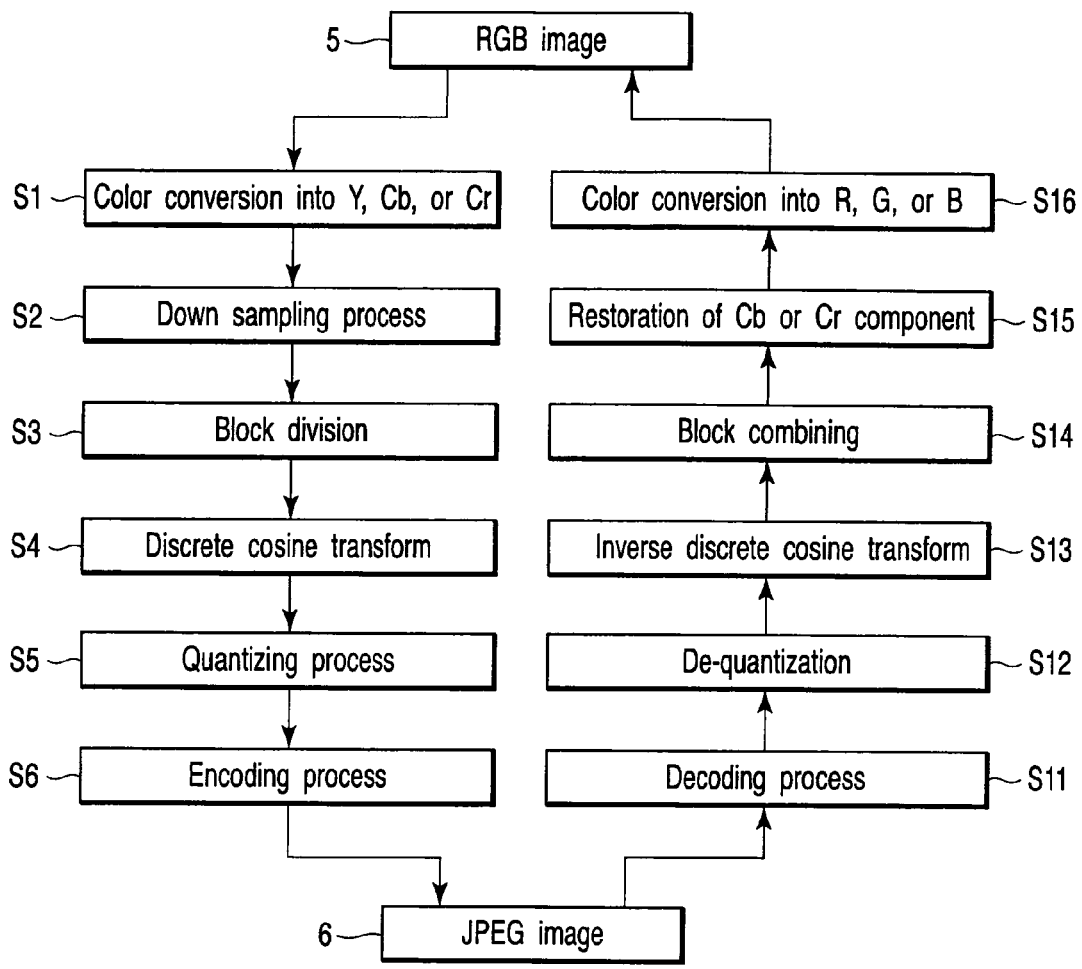
FIG. 4 is a flowchart showing a process of carrying out compression from an RGB image to a JPEG image and a process of carrying out decoding from the JPEG image to the RGB image.

FIG. 4 is a flowchart showing a general process of compressing and decoding a JPEG image. With respect to an RGB image 5 displayed by an RGB value in pixels, color conversion is carried out in the compressing process so as to represent pixels by values of luminance (Y) and color hue (Cb, Cr) in S1. Then, in S2, a down sampling process for a color phase component is carried out with respect to the color converted image. Here, in the down sampling process, an average of the adjacent values is taken, and an image size is reduced to ½, ¼ or the like.

Figure 5:
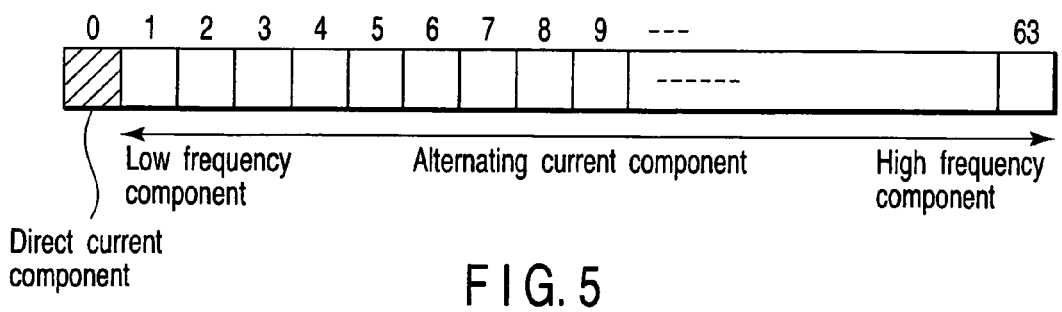
FIG. 5 is a view showing an MCU block data configuration.

Next, in S3, the image represented by Y, Cb, and Cr components is divided into 8×8 blocks. Subsequently, in S4, a secondary discrete cosine transform (DCT) is carried out into the divided 8×8 blocks as a quadrature transform, and in S5, a quantizing process is carried out with respect to the discretely cosine converted coefficient. The quantized 8×8 blocks are rearranged such that a direct current component is arranged at a 0th block and low to high frequency components of an alternating current component are arranged at first to 63rd blocks, as shown in FIG. 5. Then, in S6, an image compressing process is carried out by carrying out encoding that includes two processes, i.e., run length encoding and Huffman encoding. The encoding processes are carried out in units called minimum coded units (MCU) obtained by using 8×8 blocks consisting of a plurality of Y, Cb, and Cr components. In this manner, a JPEG image 6 is generated.

Then, in the case where the JPEG image 6 is restored to the RGB image 5, processing is carried out in accordance with a flow reversed from the compressing process. That is, in S11, a decoding process including Huffman encoding and run length encoding is carried out on an MCU-by-MCU basis, and a block is extracted. Next, in S12, coefficients in a block are rearranged in a two-dimensional 8×8 array and a de-quantizing process is carried out. Subsequently, in S13, an inverse two-dimensional discrete cosine transform (DCT) is carried out with respect to a de-quantized coefficient as an inverse quadrature transform. Then, in S14, block combining is carried out, and in S15, restoration of downsampled Cb and Cr components is carried out. In S16, color conversion is carried out with respect to R, G, and B components of the Y, Cb, and Cr components, and an RGB image 5 is restored.

Now, a process of generating an electronic watermark with respect to a JPEG image will be described in accordance with a flowchart shown in FIG. 6. A source image targeted for embedding may be a JPEG image or a RGB image. Here, a description will be given by way of example of a case of using a JPEG image as a source image.

First, in S21, to-be-embedded information is acquired, and the acquired information is divided into units of bits. Next, in S22, a JPEG image is acquired, and subjected to a decoding process. That is, decoding of a Huffman code and decoding of a run length code are carried out, and coefficients are acquired in a state in which the coefficients have been subjected to a quantizing process on a block-by-block basis. This decoding process is carried out in units of MCU described previously, and a subsequent process of embedding information is also carried out in units of MCU.

Subsequently, in S23, a process of embedding information described later is carried out with respect to the blocks in an MCU (embedding means). When information embedding terminates, the blocks are inversely quantized, the inversely quantized blocks are subjected to an inverse DCT transform serving as an inverse quadrature transform, and the thus transformed blocks are subjected to restoration of down sampling in S24. Further, block combining and color conversion in an MCU are carried out, and one MCU is restored to an image in an RGB form (restoring means). Then, in S25, a JPEG compressing process of carrying out color conversion, block dividing, and DCT transform of the image restored in the RGB form again is carried out up to a quantizing process. Then, in S26, an information extracting process described later is carried out from the quantized blocks (extracting means), and in S27, it is checked whether or not the to-be-embedded information has been correctly extracted successfully (check means).

If the information has not been correctly extracted successfully, a current repetition count and a preset upper limit value are compared with each other in S28. If the current repetition count has not reached the upper limit value, 1 is added to the current repetition count in S29. Thereafter, current processing reverts to S23 in which information embedding is carried out again (re-embedding means). The upper limit value of the repetition count is set at the upper limit value setting unit $11a$ incorporated in the application executing unit 11 (upper limit value setting means). In addition, when the current repetition count reaches the upper limit value, an information embedding process is carried out in S30. In this manner, when to-be-embedded information has not been correctly extracted successfully even if information embedding is repeatedly carried out until the upper limit value has been obtained, the embedding process can be terminated after the information embedding has been carried out (repetition terminating means). When information embedding terminates, it is determined whether or not embedding of all of the to-be-embedded information has terminated in S31.

In addition, when it is determined that the information embedded in S27 has been correctly extracted successfully, the current repetition count and a preset lower limit value are compared with each other in S32. The lower limit value of the current repetition count is set at the lower limit value setting unit $11b$ incorporated in the application executing unit (lower limit value setting means). If the current repetition count does not reach the lower limit value, 1 is added to the current repetition count in S33 (lower limit value setting means). If the current repetition count does not reach the lower limit value, 1 is added to the current repetition count in S33, and current processing reverts to S23 in which information embedding is carried out again (checking and repeating means). This is because, for example, even if information has been correctly extracted successfully by one embedding process, such an embedding process is repeated a plurality of times although it is assumed that durability is insufficient. In addition, when the current repetition count has reached the lower limit value, it is determined whether or not embedding of all the to-be-embedded information has terminated in S31.

If it is determined that the to-be-embedded information still remains in S31, current processing reverts to S22 in which a process of embedding information into a next MCU is carried out. Alternatively, if it is determined that embedding of all the to-be-embedded information has terminated in S31, an encoding process is carried out by combining an MCU in which the information has been embedded and an MCU in which no information is embedded, with each other, and a JPEG image with an electronic watermark generated is produced in S34. In this manner, embedding of to-be-embedded information is carried out with respect to part or all of a plurality of MCU blocks that configure a JPEG image.

Now, a description will be given with respect to embedding of to-be-embedded information into one item of block data in an MCU. FIG. 5 shows one item of block data acquired by decoding a JPEG image. The block data is composed of 64 coefficients from 0th to 63rd coefficients. The 0th coefficient denotes a direct current component, and the first to 63rd coefficients each denote an alternating current component, wherein the alternating current components are arranged as low component (first) to high component (63rd). Then, one specific value is selected from among the first to 63rd alternating current components, and a relationship in magnitude between this specific value and the preset evaluation value is adjusted, thereby embedding one-bit information 0 or 1.

For example, assume that coefficients of one item of block data acquired by decoding (coefficient after being quantized) are "−3 23 26 33 7 56 15 −17 −11 28 15 −5 −1 4 18 4 −7 −5 −2 0 11 4 −2 −3 −3 0 1 4 1 −2 −1 −1 0 −1 −1 1 0 0 −1 −1 −1 0 0 −1 0 0 0 −1 −1 0 0 0 0 0 0 0 0 0 0 0 0 0 0 0 0", and data obtained by de-quantizing and rearranging the above coefficients are "−24 138 280 120 216 80 104 31 156 42 −119 40 −91 29 −60 0 231 −77 −8 −60 0 −29 0 −28 196 −45 −22 −45 −26 −44 0 0 135 0 −57 0 −34 0 0 0 132 −36 −28 −32 0 0 0 0 100 −32 0 −44 0 0 0 36 0 −48 0 0 0 0 0". Then, when a 10th coefficient is selected as a specific value, −119 is obtained. In addition, when an average value of absolute values of the remaining coefficients excluding a direct current component (0th) and a specific value (10th) is used as an evaluation value, "46" is obtained.

Then, this evaluation value "46" and an absolute value |−119| of the specific value are compared with each other. Because |−119|>46, this indicates bit "1". Therefore, if to-be-embedded information at this time is "1", this specific value is maintained as it is. If to-be-embedded information is "0", a change operation is made such that an absolute value of this specific value is equal to or smaller than 46. For example, a value after being quantized is set to "0". That is, a specific value (10th) of data de-quantized corresponds to "−17" of the seventh coefficient in the data after being quantized, and thus, this value is set to "0". The operation for changing a specific value may be made for "−119" before being quantized. In addition, the sequence of the specific value may be determined from the value acquired by the embedding condition input function 23 of the application executing unit 11 or may be determined from a value owned in advance by the information embedding function 24.

Figure 6:
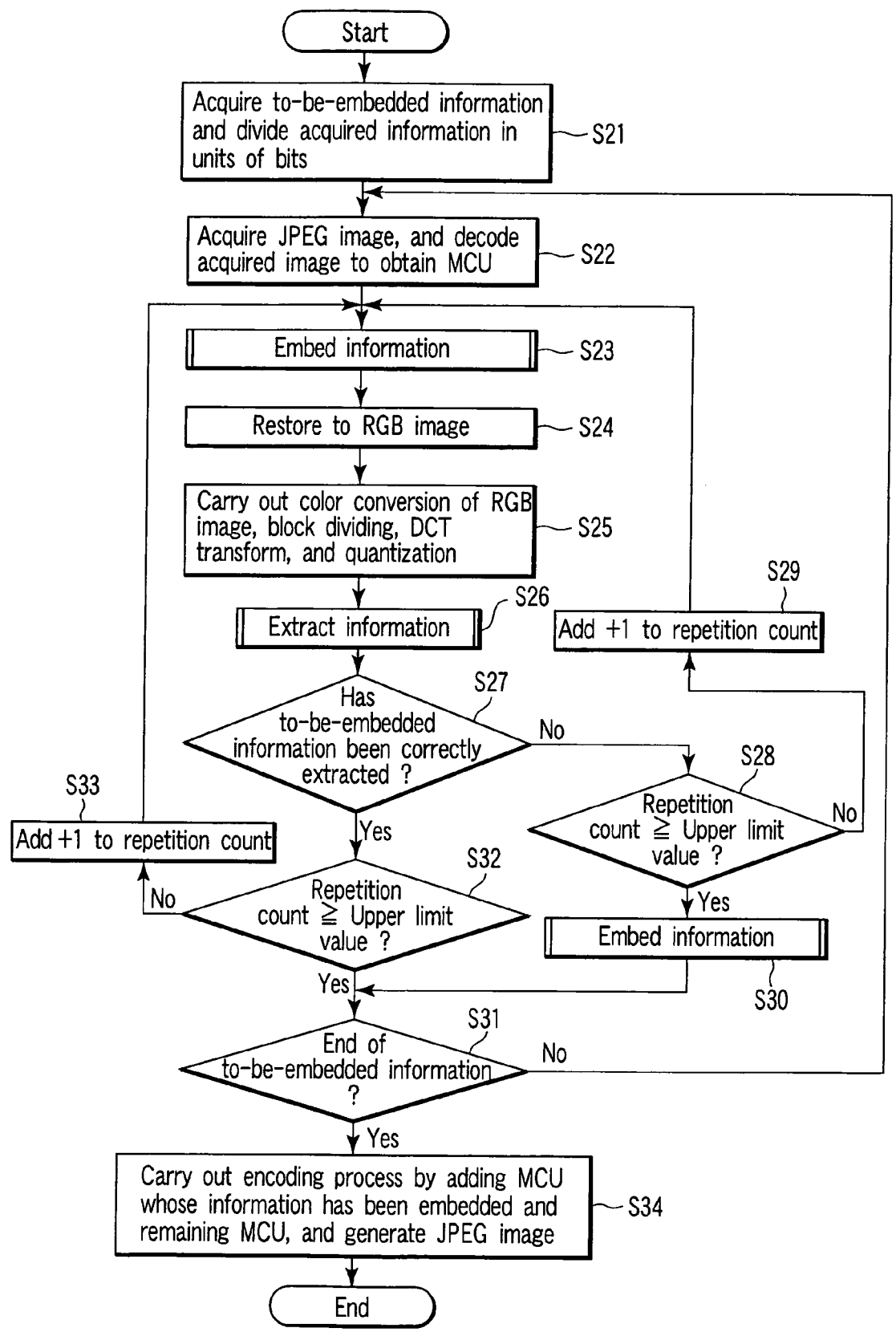
FIG. 6 is a flowchart showing an electronic watermark generating process using the application executing unit of the electronic watermark generating apparatus in the same embodiment.
Figure 7:
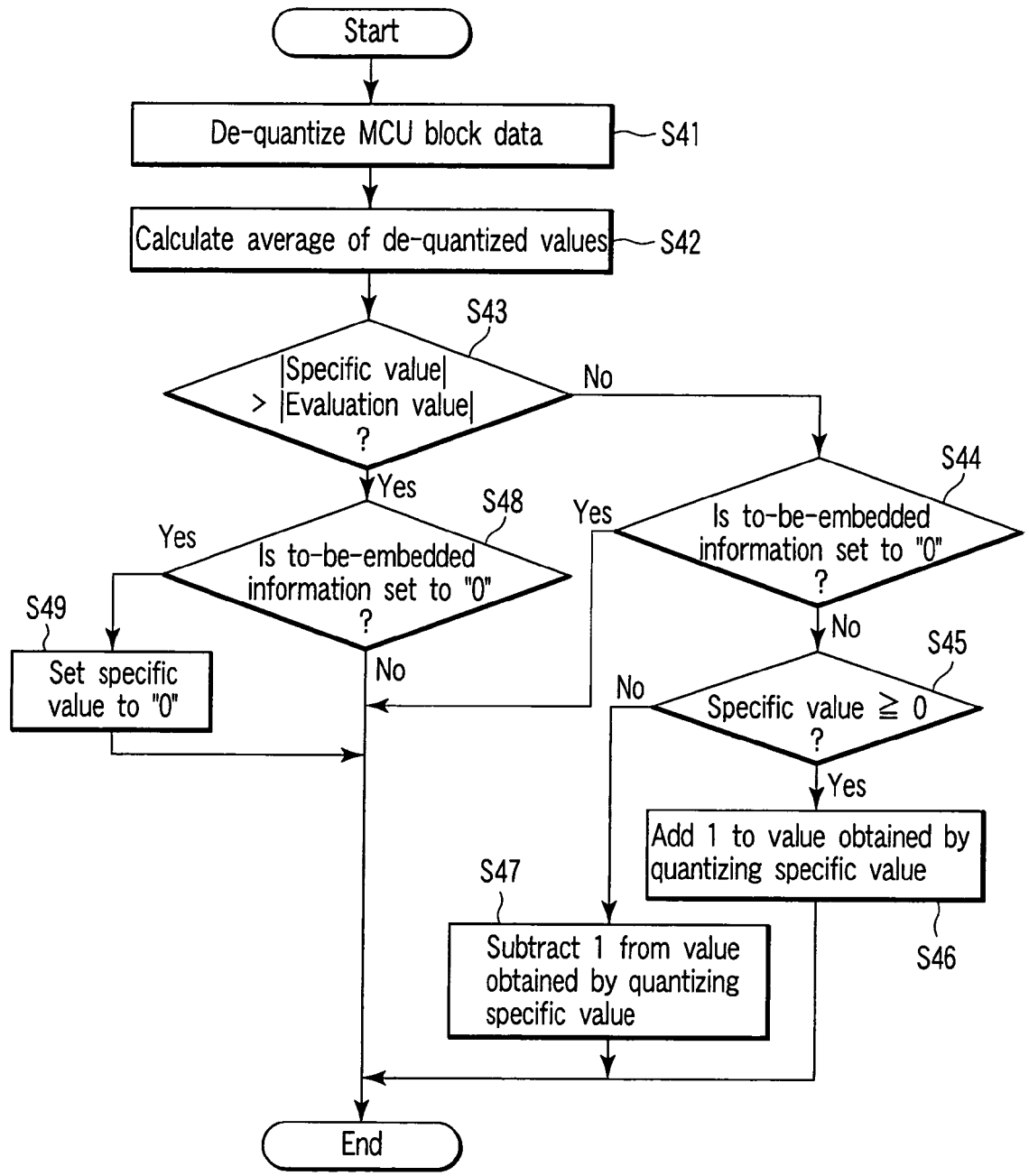
FIG. 7 is a flowchart showing an information embedding process shown in FIG. 6 in detail.

The process of embedding information in S23 and S30 shown in FIG. 6 described previously is carried out in accordance with the above-described contents, and is carried out based on a flowchart shown in FIG. 7.

First, in S41, one item of block data in an MCU is de-quantized. Then, in S42, an average value of absolute values of block data excluding a specific value (10th value of de-quantized block data) and a direct current component (0th) is obtained, and the obtained average value is defined as an evaluated value. In S43, a specific value and an absolute value of the evaluation value are compared with each other. In the case where the specific value is equal to or smaller than the evaluation value, it is checked whether or not to-be-embedded information is "0" in S44. In the case where the to-be-embedded information is "0", this embedding process is terminated.

In the case where the to-be-embedded information is "1", it is checked whether or not the specific value is equal to or greater than 0 in S45. In the case where the specific value is equal to or greater than 0, 1 is added to a value obtained by quantizing the specific value, i.e., a value before being de-quantized in S46. In the case where the specific value is less than 0, 1 is subtracted from the value obtained by quantizing the specific value, i.e., the value before being de-quantized in S47.

When it is determined that the specific value exceeds the evaluation value in the comparison shown in S43, it is then checked whether or not the to-be-embedded information is "0" in S48. In the case where the to-be-embedded information is not "0", i.e., in the case where the information is "1", the embedding process is terminated. In the case where the to-be-embedded information is "0", a value obtained by quantizing the specific value, i.e., a value before being de-quantized is set to 0 in S49.

Block data for determining a relationship in magnitude between the specific value and the evaluation value may be obtained as data before being de-quantized (in a state in which quantization has been carried out) or may be obtained as data after being de-quantized (in a state in which no quantization has been carried out). In addition, block data for adjusting a relationship in magnitude may be obtained as data before being de-quantized (in a state in which quantization has been carried out) or may be obtained as data before being de-quantized (in a state in which quantization has been carried out). In the case where block data in a state of being quantized into a specific value and an evaluation value is used, a de-quantizing process shown in S41 is not carried out, and the block data in a quantized state is used for calculation of the evaluation value in S42.

The embedding of block data may be carried out with respect to all the blocks in an MCU or may be carried out by limiting to only a pre-selected block, for example, only the Y component or only the Cb and Cr components. Although an embedding operation has been made while only one specific value is selected with respect to one block, a plurality of bit information may be embedded by selecting a plurality of specific values. In this case, it is necessary to share information indicating which block or specific value is targeted for embedding on the embedding side and the extracting side.

Figure 8:
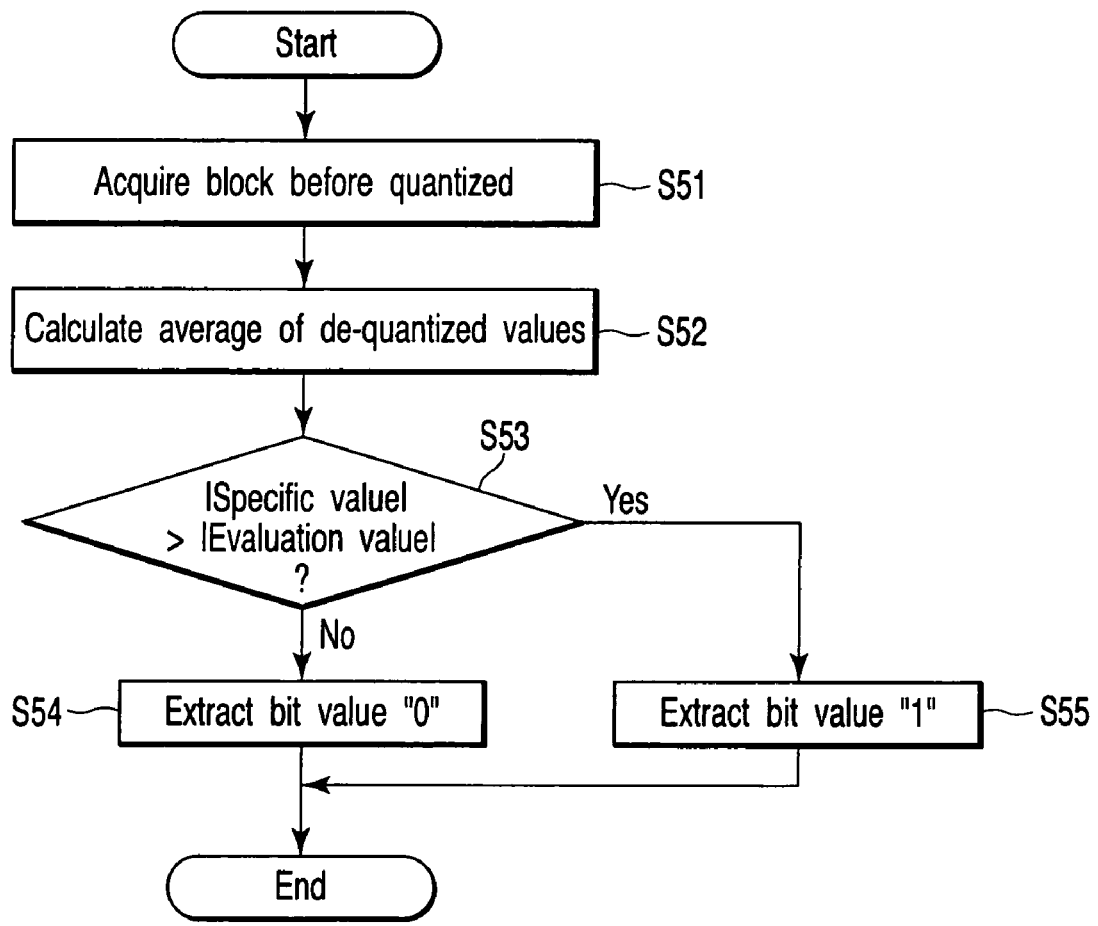
FIG. 8 is a flowchart showing an information extracting process shown in FIG. 6 in detail.

The process of extracting information in S26 of FIG. 6 described previously is carried out based on a flowchart shown in FIG. 8.

First, in S51, one clock before being quantized (after being de-quantized) is acquired. Then, in S52, an average value of absolute values of the remaining coefficients excluding a direct component (0th) and a specific value (10th) is obtained from among block data, and the obtained average value is defined as an evaluation value. In S53, a specific value and an absolute value of the evaluation value are compared with each other. In the case where the specific value is equal to or smaller than the evaluation value, "0" is extracted as extraction information in S54. In the case where the specific value exceeds the evaluation value, "1" is extracted as extraction information in S55.

There is a need for an information extracting process to be carried out in response to an information embedding process. The corresponding condition includes which coefficient in block data has been defined as a specific value in to-be-embedded information or whether or not block data after being quantized or block data before being quantized has been used for evaluation of a relationship in magnitude at the time of embedding information.

In the case where an electronic watermark is thus produced while to-be-embedded information is embedded in a JPEG image, bit information is embedded with respect to MCU block data obtained by decoding the JPEG image. Thereafter, the data is restored to an RGB image. Further, a state quantized from the RGB image is restored, information is extracted, and it is checked whether or not the to-be-embedded information has been correctly extracted. Even if it is checked that the information has been correctly extracted, this checking is repeated again, and the RGB image is repeatedly restored a plurality of times, thereby making it possible to sufficiently enhance durability of the to-be-embedded information with respect to the JPEG image.

Accordingly, the JPEG image having embedded with the to-be-embedded information is restored to the RGB image by changing a compression rate or the like, and the to-be-embedded information can be correctly extracted even if the JPEG image has been constructed again. That is, an electronic watermark image featured in that the to-be-embedded information has high durability relevant to image recompression can be produced.

If the upper limit value of the repetition count is increased, the durability relevant to information recompression is improved, but an image is extremely degraded. This is also true for the lower limit value. For this reason, it is necessary to make balance adjustment between to-be-embedded information durability and image degradation by a repetition count.

In the present embodiment, both of the upper limit value and the lower limit value have been provided for a condition for carrying out a repeating process, but not limited thereto. The repeating process may be carried out until to-be-embedded information has been correctly extracted without providing the upper limit value. In addition, in the case where to-be-embedded information has been correctly extracted successfully without providing the lower limit value, the end of to-be-embedded information in S31 may be determined. Even if the lower limit value is not set, current data is restored to data quantized after restored to the RGB image at least one time, extracting of to-be-embedded information is carried out, thus making it possible to improve durability of the to-be-embedded information.

Figure 9:
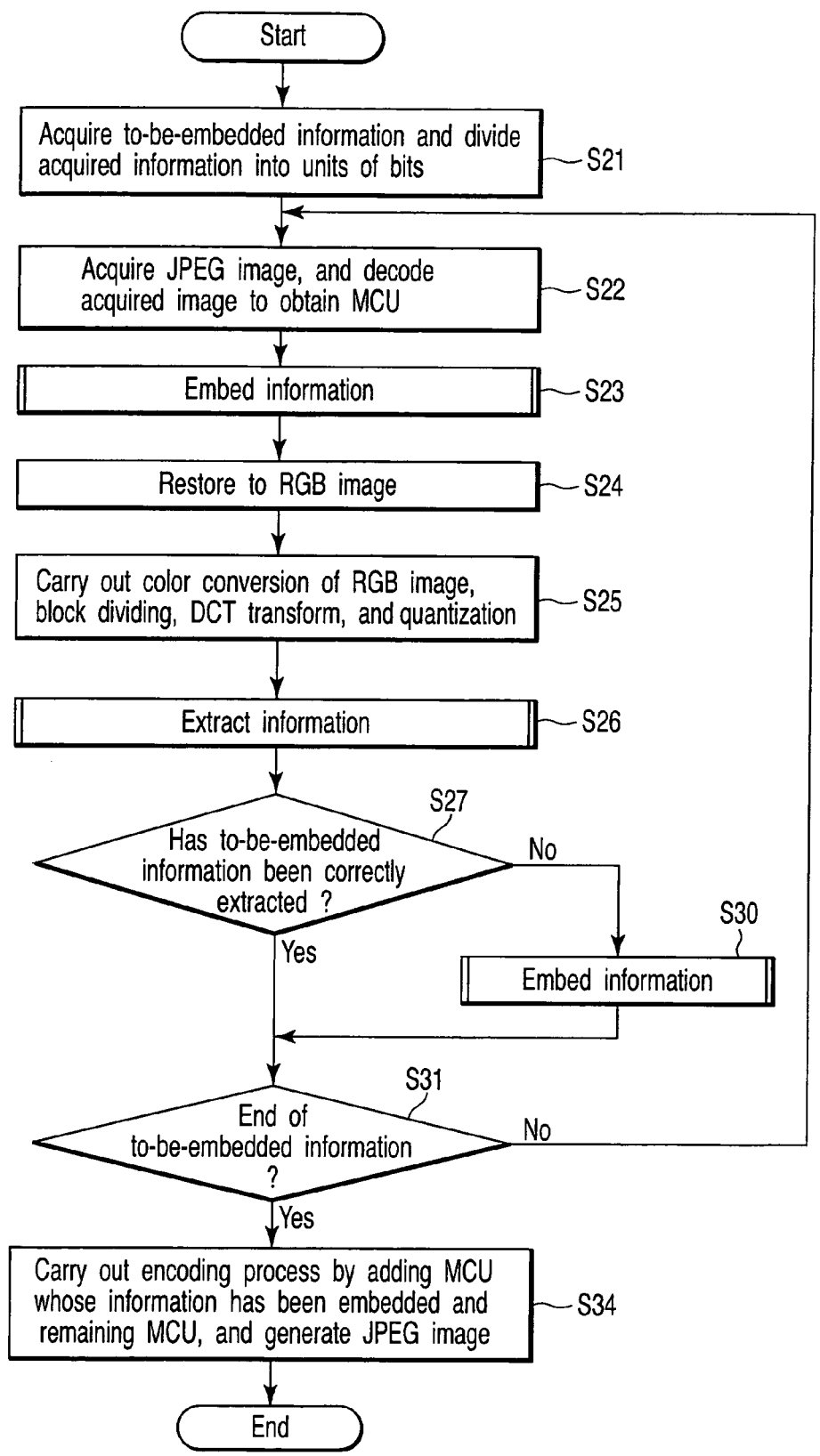
FIG. 9 is a flowchart showing a modified example of an electronic watermark generating process using the application execution section of the electronic watermark generating apparatus in the same embodiment.

Further, as shown in FIG. 9, if it is checked that information has not been correctly extracted successfully in S27 without providing the upper limit value or the lower limit value, an information embedding process is carried out in S30, and determination of the end of to-be-embedded information in S31 is carried out. When it is checked that information has been correctly extracted sufficiently in S27, determination of the end of to-be-embedded information in S31 may be carried out immediately.

In addition, a value obtained by adding a predetermined value or a value obtained by subtracting a predetermined value may be used as an evaluation value only at the time of embedding information with respect to an evaluation value used for information embedding and extracting processes. For example, a value obtained by adding +10 to a reference evaluation value is used as an evaluation value at the time of embedding information, and a reference evaluation value is used intact as an evaluation value at the time of extraction information. In this manner, in the case where a state of the specific value>the evaluation value is established by embedding information, the specific value is greater than the evaluation value by at least 10 or more. Even if the specific value or evaluation value has been changed by means of an image recompressing process, a relationship of the specific value>the evaluation value is maintained if a change quantity is smaller than 10 in total, thus making it possible to correctly capture information. In the case where an attempt is made to establish a state of the specific value<the evaluation value by embedding information, a value obtained by subtracting a predetermined value from a reference evaluation value at the time of embedding information is defined as an evaluation value.

In the case where to-be-embedded information is thus extracted from a JPEG image having protruding therefrom an electronic watermark having high durability relevant to image recompression, an electronic watermark extracting device 7 shown in FIG. 10 is used. The electronic watermark extracting device 7 receives the electronic watermark image 4 produced by the electronic watermark generating apparatus 1 (JPEG image having produced therefrom on electronic watermark), and extracts the extraction information 8. The extraction information 8 is made of, for example, coupon information, commodity ticket information and membership information such as a numeric value or a text. In this manner, the electronic watermark image 4 can be utilized as coupon, commodity ticket and a membership certificate.

The electronic watermark extracting device 7 is made of a CPU, a ROM, a RAM or the like, as shown in FIG. 11. The extracting device includes: an application executing unit 31 for executing a variety of application; a memory unit 32 composed of a rewritable memory such as a RAM; a key input unit 33; a display unit 34 for displaying information such as an image or a text; and an information input/output unit 35 for externally inputting/outputting information. The electronic watermark extracting device 7 is provided in, for example, a server, a portable cellular phone, a POS terminal and the like.

The application executing unit 31, as shown in FIG. 12, comprises application programs for executing an image input function 41 for acquiring the electronic watermark image 4 from the information input/output unit 35 and also acquiring the electronic watermark image 4 from the memory unit 32 and an information extracting function 42 for extracting to-be-embedded information from the electronic watermark image acquired by the image input function 41.

Figure 13:
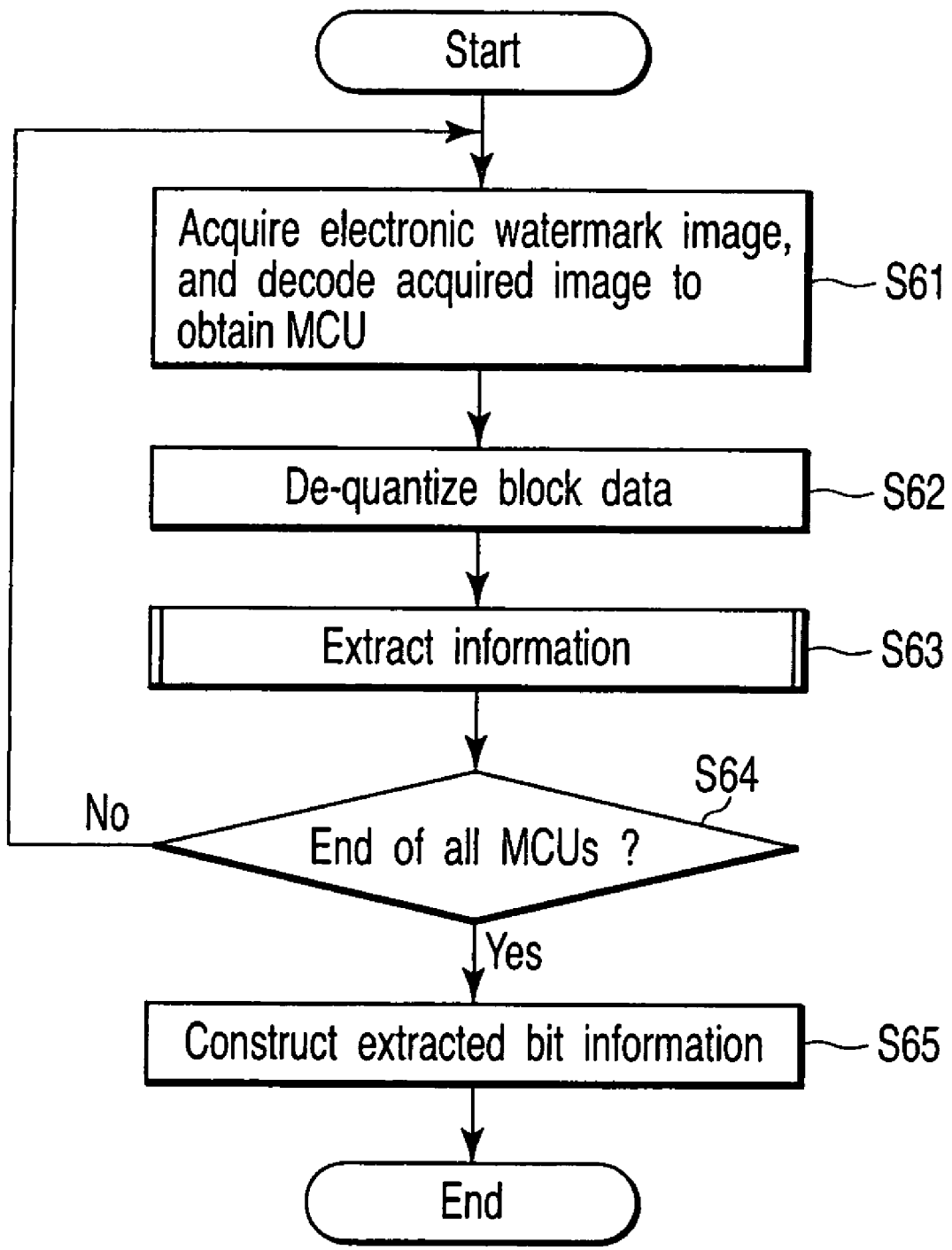
FIG. 13 is a flowchart showing an electronic watermark extracting process using the application executing unit of the same electronic watermark extracting apparatus.

A process for the electronic watermark extracting device 7 to extract the extraction information 8 from an electronic watermark image is carried out based on a flowchart shown in FIG. 13. First, in S61, a process of decoding a JPEG image having produced a predetermined electronic watermark that is an electronic watermark image is carried out to obtain an MCU. That is, decoding of a Huffman code and decoding of a run length code are carried out to obtain a coefficient in a state in which quantizing process has been carried out on a block-by-block basis. This block acquisition is carried out in units of MCU, and the subsequent process is also carried out in units of MCU.

Subsequently, in S62, a de-quantizing process is carried out with respect to blocks contained in the acquired MCU. Then, in S63, a process of extracting to-be-embedded information from the de-quantized block data is carried out. The extracting process at this time is the same as that in S26 described previously. Specifically, the extracting process is the same as the processing operation shown in FIG. 7. That is, the embedded information is extracted on one-by-one bit basis.

Then, in S64, it is checked whether or not a processing operation have been carried out with respect to all the MCUs contained in the JPEG image. If the processing operation has not terminated, current processing reverts to S61 in which an information extracting processing is carried out with respect to a next MCU. If the processing operation terminates with respect to all the MCUs, on the other hand, construction of the extracted bit information is carried out in S65.

It is necessary to carry out a process of extracting these items of information in response to an information embedding process. The corresponding condition includes: which coefficient in block data has been defined as a specific value for embedding information; whether or not block data in a quantized state has been utilized for evaluation of a relationship in magnitude; or which block in an MCU has been targeted for embedding. In the case of using block data in a state of being quantized for evaluation of a relationship in magnitude, the de-quantizing process in S62 is not carried out, but information extracting is carried out by using block data in a state of being quantized for an evaluation value.

SECOND EMBODIMENT

Now, a second embodiment will be described here. Like constituent elements according to the first embodiment described previously are designated by like reference numerals, and a detailed description is omitted here.

Now, a description will be given with respect to a case of using a JPEG2000 image 9 as an irreversible compression image.

Figure 14:
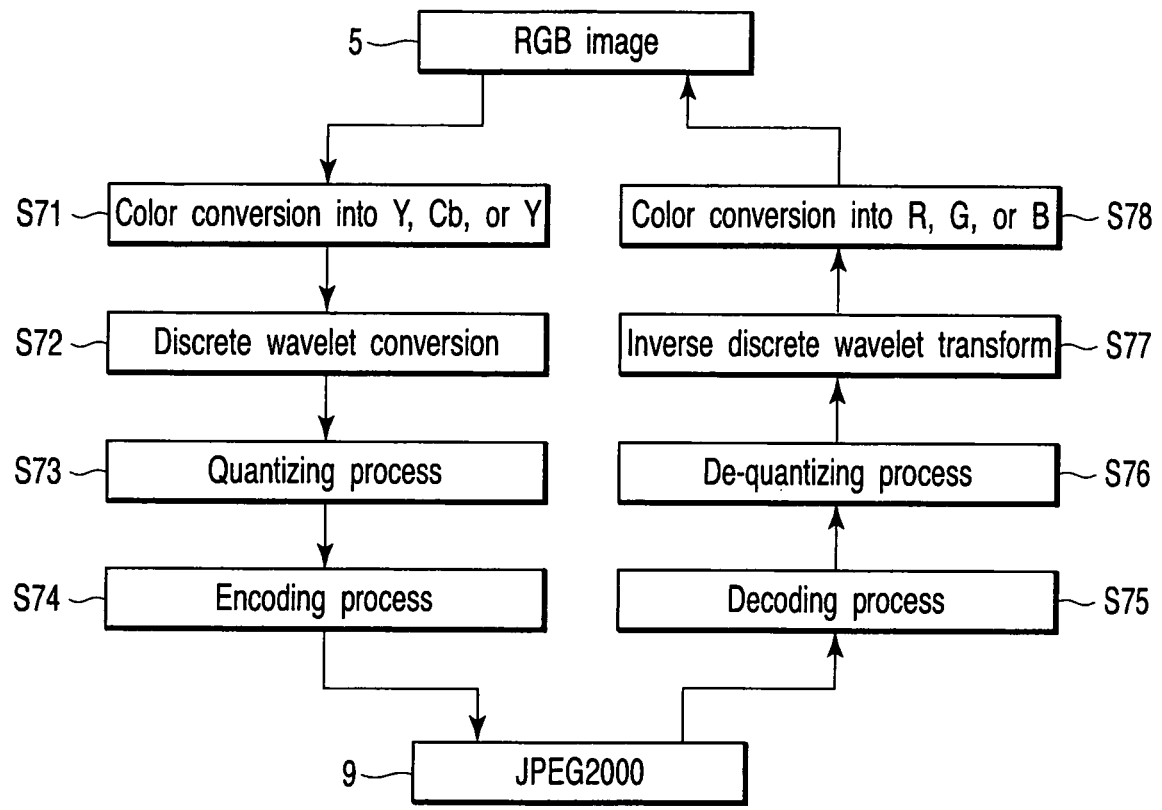
FIG. 14 is a flowchart showing an electronic watermark generating process using an application executing unit of an electronic watermark generating apparatus according to a second embodiment of the present invention.

FIG. 14 is a view showing a general irreversible compression or decoding process of the JPEG2000 image 9. In the compressing process, color conversion is carried out so as to representing pixels by values of luminance (Y) and color hues (Cb, Cr) in S71 with respect to an RGB image 5 for pixels to be displayed by an RGB value. Then, in S72, a discrete wavelet transform (DWT) is carried out. In S73, a quantizing process is carried out with respect to the discrete wavelet converted coefficient. The quantized coefficient is divided into blocks. In S74, Embedded Block with Optimized Truncation (EBCOT) including a processing operation such as coefficient modeling or arithmetic encoding is carried out as an encoding process, and the JPEG2000 image 9 is produced.

In the case where the JPEG2000 image 9 is restored to the RGB image 5, processing is carried out in accordance with a flow reversed from a compressing process. That is, in S75, inverse EBCOT transform is carried out as decoding. Next, in S76, a de-quantizing process is carried out. Subsequently, in S77, an inverse discrete wavelet transform is carried out with respect to the de-quantized coefficient. Then, in S78, Y, Cb, and Cr components are color-converted into R, G, and B components, and the RGB image 5 is restored.

Figure 15:
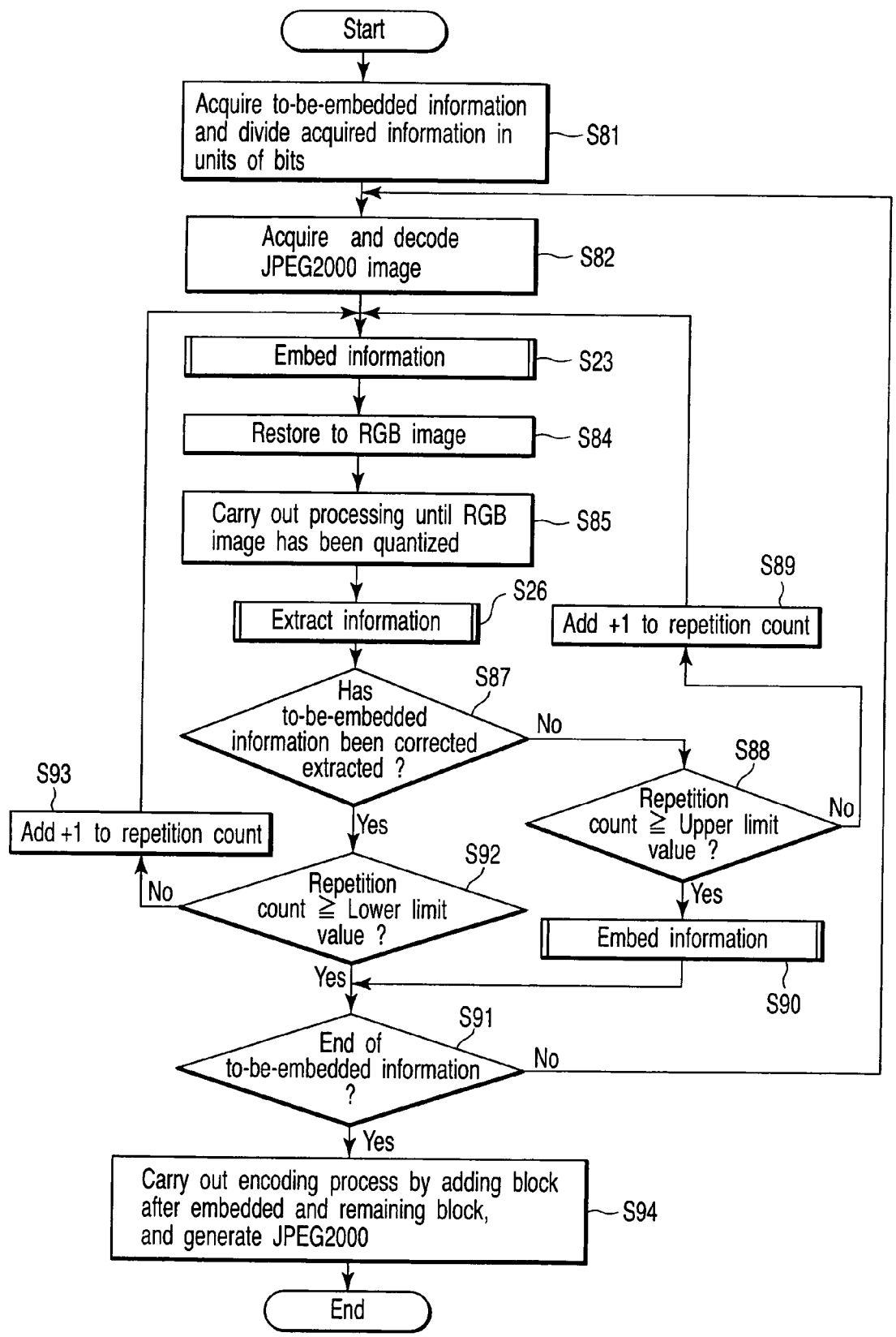
FIG. 15 is a flowchart showing an information embedding process shown in FIG. 14 in detail.

Now, a process of producing an electronic watermark with respect to the JPEG2000 image 9 will be described with reference to a flowchart shown in FIG. 15. A source mage targeted for embedding may be the JPEG2000 image 9 or may be an RGB image. A description will be given by way of example of a case of using the JPEG2000 image 9 as a source image.

First, in S81, to-be-embedded information is acquired, and the acquired information is divided in units of bits. Next, in S82, the JPEG2000 image 9 is acquired and subjected to a decoding process, and a coefficient is acquired in a state of being quantized to be divided in units of blocks.

Subsequently, in S23, the process of embedding information described previously is carried out with respect to blocks (embedding means). Although a block for carrying out a process of encoding the JPEG2000 image 9 can obtain an arbitrary value whose height and width ranges from 4 to 1024 and whose area is equal to or smaller than 4096, a 8×8 block size is obtained for utilizing the same method as that in S23.

When information embedding terminates, a block is subjected to de-quantizing, inverse DWT transform, and color conversion, and an image in the RGB format is restored in S84 (restoring means). In S85, a JPEG2000 compressing process for carrying out color conversion and DWT transform of the image stored in the RGB format again is carried out until a quantizing process has been carried out. Then, the information extracting process described previously is carried out from the quantized blocks in S26 (extracting means). In S87, it is checked whether or not the embedded information has been correctly extracted sufficiently. As in the embedding process S23, a block size for carrying out an encoding process using the JPEG2000 image is defined as 8×8, thereby making it possible to utilize the extracting process in S26. Then, in S87, it is checked whether or not the embedded information has been correctly extracted successfully (checking means).

If the information has not been correctly extracted successfully, a current repetition count and a preset upper limit value are compared with each other in S88. If the current repetition count does not reach the upper limit value, 1 is added to the current repetition count in S89, and then, current processing reverts to S23 in which information embedding is carried out again (re-embedding means). The upper limit value of the repetition count is set at the upper limit setting unit 11a incorporated in the application executing unit 11 (upper limit value setting means). When the current repetition count reaches the upper limit value, an information embedding process is carried out in S90. In this manner, when the embedded information has not been correctly extracted successfully even if embedding of information is repeatedly carried out until the upper limit value has been obtained, information embedding is carried out, and then, an embedding processing can be terminated. When information embedding terminates, it is determined whether or not embedding of all items of to-be-embedded information has terminated in S91.

In addition, when it is determined that the information embedded in S87 has been correctly extracted successfully, the current repetition count and the preset lower limit value are compared with each other in S92. The lower limit value of the repetition count is set at the lower limit value setting unit 11b incorporated in the application executing unit 11 (lower limit setting means). If the current repetition count does not reach the lower limit value, 1 is added to the current repetition count in S93, and then, current processing reverts to S83 in which information embedding is carried out again. This is because, for example, even if information has been correctly extracted successfully by one embedding process, a embedding process is repeated in plurality, assuming that durability is insufficient. In addition, when the current repetition count reaches the lower limit value, it is determined whether or not embedding of all the to-be-embedded information has terminated in S91.

When it is determined that the to-be-embedded information still remains in S91, current processing reverts to S82 in which a process of embedding information with respect to a next block is carried out. When it is determined that embedding of all the to-be-embedded information has terminated in S91, an encoding process is carried out by adding a block in which information has been embedded and a block in which no information has been embedded, and then, a JPEG2000 image having produced an electronic watermark is produced in S94. In this manner, embedding of the to-be-embedded information is carried out with respect to part or all of a plurality of blocks that configure the JPEG2000 image 9. Even if to-be-embedded information has been embedded into the JPEG2000 image 9, the durability of the embedded information relevant to the JPEG2000 image can be improved as in the first embodiment.

Figure 16:
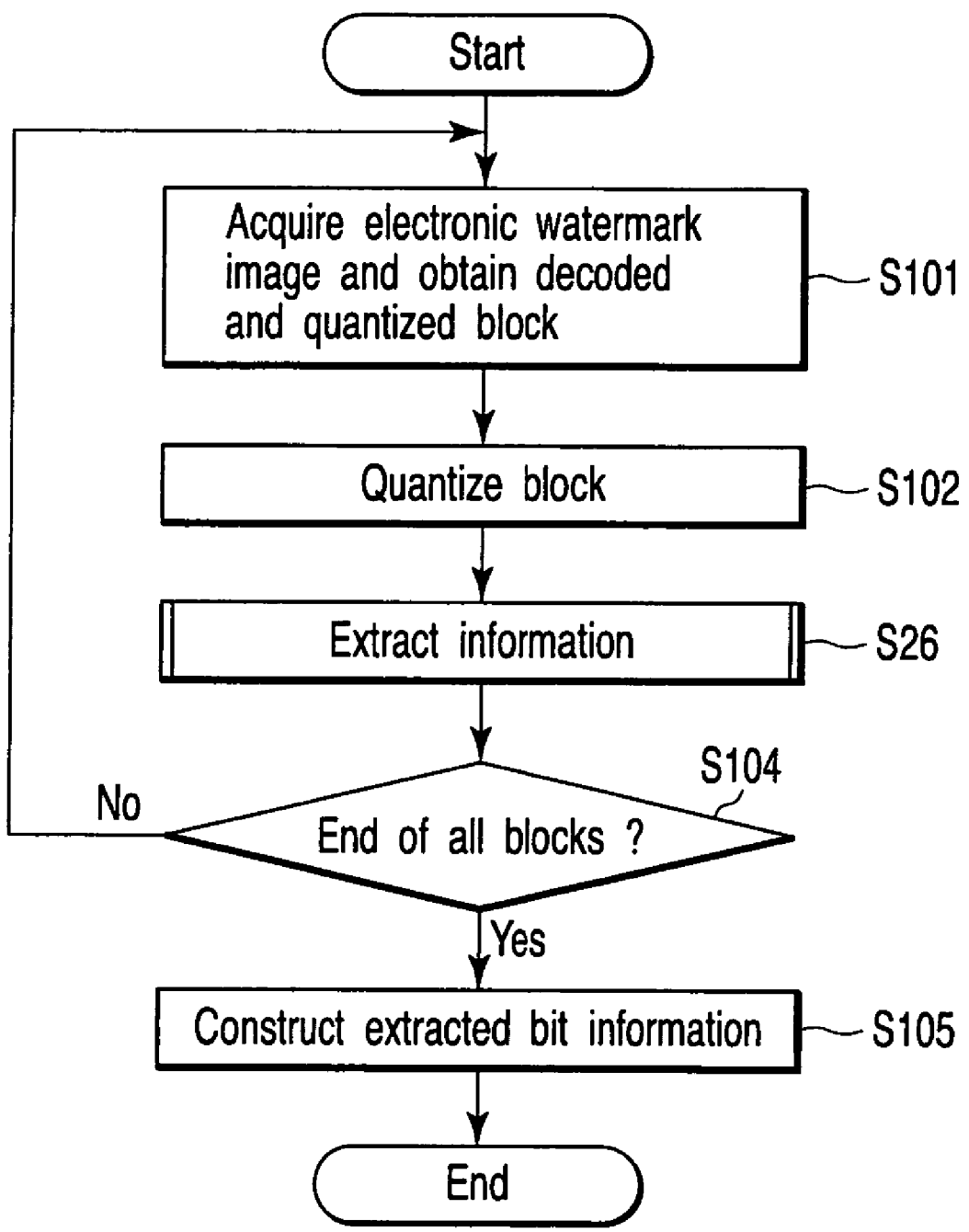
FIG. 16 is a flowchart showing an information extracting process shown in FIG. 14 in detail.

A processing operation of the electronic watermark device 7 for extracting the extraction information 8 from an electronic watermark image having information embedded in the JPEG2000 image 9 is carried out based on a flowchart shown in FIG. 16. First, in S101, an encoding process is carried out with respect to the JPEG2000 image having produced an electronic watermark that is an electronic image, and a coefficient is obtained in a state of being quantized and divided in units of blocks.

Subsequently, in S102, a de-quantizing process is carried out with respect to the acquired coefficient. In S26, a process of extracting embedded information is carried out from data de-quantized in units of blocks. The extracting process at this time is the same as that in S26 described previously, and specifically, the extracting process is the same as that shown in FIG. 7. That is, the embedded information is extracted on one-by-one bit basis. Then, in S104, it is checked whether or not processing has been carried out with respect to all the block data contained in the JPEG2000 image. If processing does not terminate, the current processing reverts to S101 in which an information extracting process is carried out with respect to a next block. If processing does not terminate with respect to all the blocks, on the other hand, construction of the extracted bit information is carried out in S105.

There is a need for a process of extracting these items of information to be carried out in response to a process of embedding information. The corresponding condition includes which coefficient in block data has been defined as a specific value for embedding information, whether or not block data in a quantized state has been utilized for evaluation of a relationship in magnitude, and whether or not a size of a 8×8 block is established. In the case where block data is used in a state of being quantized for evaluation of a relationship in magnitude, a de-quantizing process in S102 is not carried out, but information extracting is carried out by using block data in a state of being quantized for an evaluation value.

Although the present embodiment has described a function for carrying out the invention as an application executing unit has been incorporated in equipment, a program for carrying out a similar function may be downloaded in a computer incorporated in equipment from a network without being limited thereto. In addition, a program for carrying out a similar function is stored in a recording medium such that the program may be installed in a computer incorporated in equipment. A recording medium may be provided as a recording medium such as a CD-ROM which is capable of storing a program and which is read by equipment. A mode thereof may be any mode. In addition, a function that can be thus obtained in advance by installing or downloading it may be carried out in cooperation with an operating system (OS) inside equipment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic watermark generating apparatus comprising:
   embedding means for embedding to-be-embedded information as an electronic watermark in a quantized block of an irreversible compression image produced by carrying out quantization on a block-by-block basis after an RGB image has been subjected to color conversion to be divided in a plurality of blocks;

restoring means for restoring an RGB image by carrying out de-quantization with respect to a block in which to-be-embedded information has been embedded by the embedding means;

extracting means for color-converting the restored RGB image and dividing the color-converted RGB image into a plurality of blocks, and then, carrying out quantization on a block-by-block basis, thereby extracting to-be-embedded information from the quantized blocks;

re-embedding means for, when it is not checked that the to-be-embedded information has been correctly extracted by checking means for checking whether or not the to-be-embedded information has been correctly extracted by the extracting means, embedding the to-be-embedded information as an electronic watermark again in the quantized blocks; and upper limit value setting means for setting an upper limit value of the repetition count of extracting to-be-embedded information by the extracting means and checking whether or not the to-be-embedded information has been correctly extracted by the checking means.

2. An electronic watermark generating apparatus according to claim 1, wherein the re-embedding means is repeated until the checking means checks that the to-be-embedded information has been correctly extracted.

3. An electronic watermark generating apparatus according to claim 1, further comprising: repetition terminating means for, when the checking cannot be made even if repetition of the extracting and the checking reaches the upper limit value, terminating repetition of the extracting and the checking by embedding the to-be-embedded information again.

4. An electronic watermark generating apparatus according to claim 3, further comprising: check repeating means for, even if it is checked that the to-be-embedded information has been correctly extracted by repeating the extracting and the checking until the repetition count has reached the lower limit value, repeating extraction of to-be-embedded information by the extracting means and a check as to whether or not the to-be-embedded information has been correctly extracted by the checking means.

5. An electronic watermark generating method in an electronic watermark generating apparatus, the method comprising:

embedding to-be-embedded information as an electronic watermark in a quantized block of an irreversible compression image produced by carrying out quantization on a block-by-block basis after an RGB image has been subjected to color conversion to be divided in a plurality of blocks;

restoring an RGB image by carrying out de-quantization with respect to a block in which the to-be-embedded information has been embedded;

color-converting the restored RGB image and dividing the color-converted RGB image into a plurality of blocks, and then, carrying out quantization on a block-by-block basis, thereby extracting to-be-embedded information from the quantized blocks;

checking whether or not to-be-embedded information has been correctly extracted;

when it is not checked that the to-be-embedded information has been correctly extracted, embedding the to-be-embedded information as an electronic watermark again in the quantized blocks; and setting an upper limit value of the repetition count of extracting to-be-embedded information by the extracting step and checking whether or not the to-be-embedded information has been correctly extracted by the checking step.

6. An electronic watermark generating method according to claim 5, further comprising:

when it is not checked that the to-be-embedded information has been embedded, repeating embedding of the to-be-embedded information until it is checked that the to-be-embedded information has been correctly extracted.

7. An electronic watermark generating method according to claim 5, further comprising:

when it is not checked that the to-be-embedded information has been correctly extracted even if the repetition count of embedding of the to-be-embedded information reaches a preset upper limit value, re-embedding the to-be-embedded information and terminating the repetition.

8. An electronic watermark generating method according to claim 5, further comprising:

even if it checked that the to-be-embedded information has been correctly extracted until the repetition count of embedding of the to-be-embedded information has reached a lower limit value, repeating embedding of the to-be-embedded information.

9. An electronic watermark generating method according to claim 8, further comprising:

even if it checked that the to-be-embedded information has been correctly extracted until the repeating count of embedding of the to-be-embedded information has reached a lower limit value, repeating embedding of the to-be-embedded information.

10. An electronic watermark generating program stored in a computer readable medium, said program causing a computer to execute:

an embedding function of embedding to-be-embedded information as an electronic watermark in a quantized block of an irreversible compression image produced by carrying out quantization on a block-by-block basis after an RGB image has been subjected to color conversion to be divided in a plurality of blocks;

a restoring function of restoring an RGB image by carrying out de-quantization with respect to a block in which the to-be-embedded information has been embedded;

an extracting function of color-converting the restored RGB image and dividing the color-converted RGB image into a plurality of blocks, and then, carrying out quantization on a block-by-block basis, thereby extracting to-be-embedded information from the quantized blocks;

a re-embedding function for, when it is not checked that the to-be-embedded information has been correctly extracted by a checking function of checking whether or not the to-be-embedded information has been correctly extracted, embedding the to-be-embedded information as an electronic watermark again in the quantized blocks; and an upper limit value setting function for setting an upper limit value of the repetition count of extracting to-be-embedded information by the extracting function and checking whether or not the to-be-embedded information has been correctly extracted by the checking function.

11. An electronic watermark generating program according to claim 10, causing a computer to further execute: a function of when it is not checked that the to-be-embedded information has been embedded by the re-embedding function, repeating embedding of the to-be-embedded information until it is possible to check that the to-be-embedded information has been correctly extracted.

12. An electronic watermark generating program according to claim 10, causing a computer to further execute: a repetition terminating function of, when it is not checked that the to-be-embedded information has been correctly extracted even if the repetition count of embedding of the to-be-embedded information reaches a preset upper limit value, re-embedding the to-be-embedded information and terminating the repetition.

13. An electronic watermark generating program according to claim 10, causing a computer to further execute: a check repeating function of, even if it is checked that the to-be-embedded information has been correctly extracted until the repeating count of embedding of the to-be-embedded information has reached a lower limit value, repeating embedding of the to-be-embedded information.

* * * * *

UNITED STATES PATENT AND TRADEMARK OFFICE
CERTIFICATE OF CORRECTION

| | |
|---|---|
| PATENT NO. | : 7,613,319 B2 |
| APPLICATION NO. | : 11/401381 |
| DATED | : November 3, 2009 |
| INVENTOR(S) | : Kunieda et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this

Nineteenth Day of October, 2010

David J. Kappos
*Director of the United States Patent and Trademark Office*